Nov. 26, 1968  G. KLAPPRODT ET AL  3,412,489
COUPLING APPARATUS
Filed Sept. 9, 1966  2 Sheets-Sheet 1
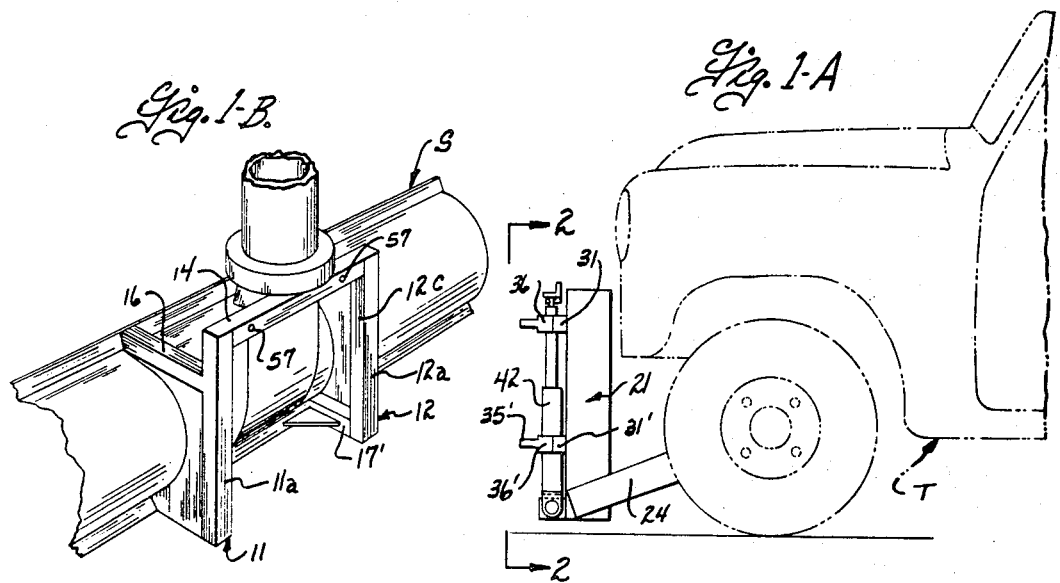
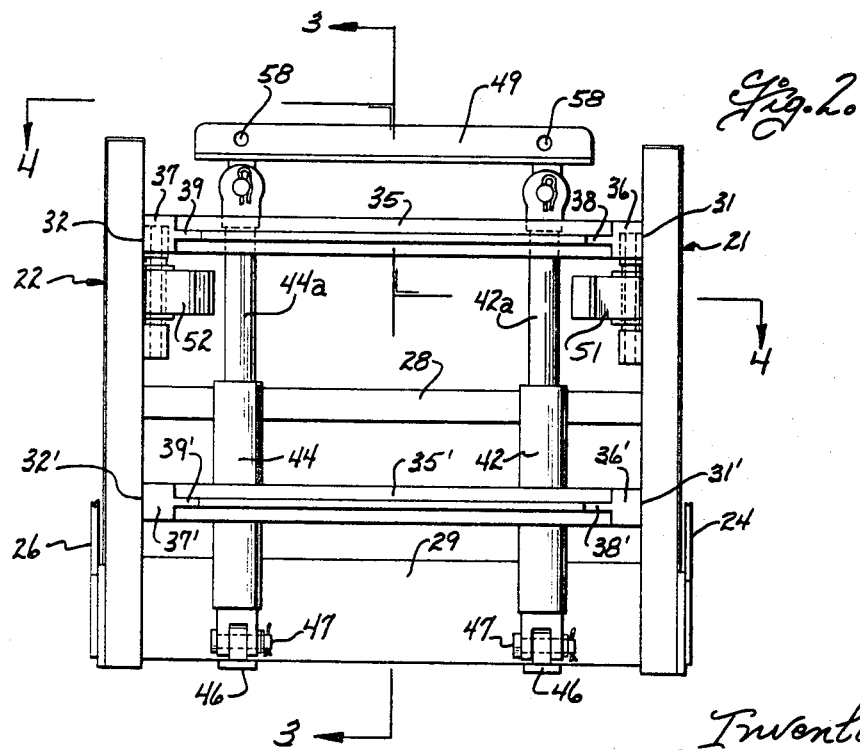

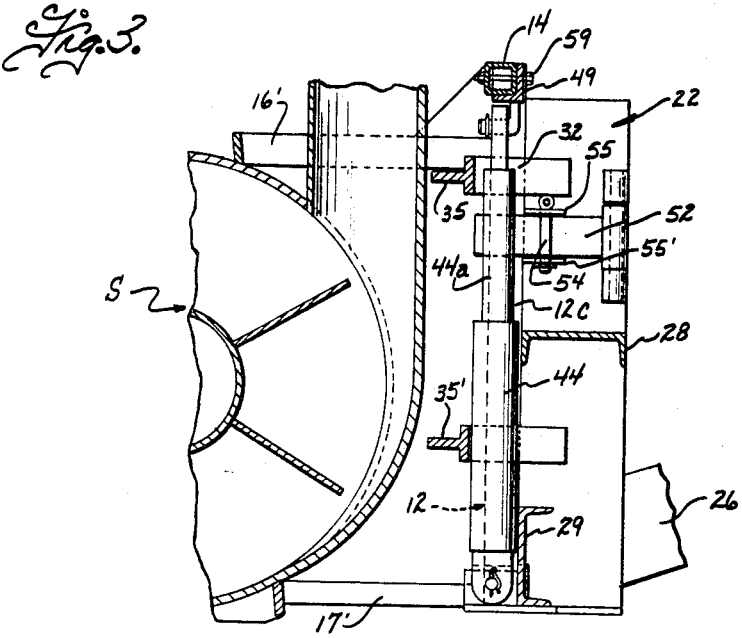
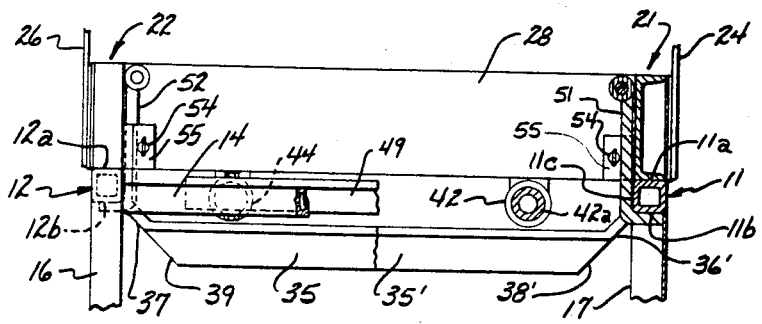

United States Patent Office 3,412,489
Patented Nov. 26, 1968

3,412,489
COUPLING APPARATUS
Glen Klapprodt, Mount Morris, and Eskil W. Swenson, Cherry Valley, Ill., assignors to Swenson Spreader & Mfg. Co., Lindenwood, Ill., a corporation of Illinois
Filed Sept. 8, 1966, Ser. No. 578,041
7 Claims. (Cl. 37—42)

ABSTRACT OF THE DISCLOSURE

A quick-hitch coupling apparatus employs an inverted U-shaped frame on the implement and a corresponding U-shaped rail frame mounted on the vehicle with alignment of the frames effected by a centering bar with shoulders extending outwardly from the rail frame. Lateral movement is prevented by shoulders adjacent the inner side of each rail and by hooks mounted on the rail frame which engage the back sides of the implement frame legs. Vertical adjustment is effected by hydraulic lifting means which engage the central portion of the implement frame.

---

This invention relates to a coupling apparatus for coupling an implement and a vehicle.

It is an object of the present invention to provide a new and useful coupling apparatus for coupling an implement and a vehicle whereby the implement is vertically adjustable relative to the vehicle.

Another object is to provide a coupling apparatus in accordance with the foregoing and which holds the implement from lateral and longitudinal movement relative to the vehicle.

Yet another object is to provide a new and useful coupling apparatus having centering means to facilitate aligning the various portions as the vehicle is moved to coupling position.

Still another object of the present invention is to provide a coupling apparatus of simplified construction, which occupies a minimum amount of space, and which is sturdy and convenient to use.

These, and other objects and advantages of the present invention, will become apparent as the same becomes better understood from the following detailed description when taken in conjunction with the accompanying drawings wherein:

FIGURE 1–A is a side view of an apparatus constructed in accordance with the present invention and mounted on a vehicle;

FIG. 1–B is a perspective view of an implement to be coupled to the vehicle of FIG. 1–A;

FIG. 2 is a front elevational view taken generally along line 2—2 of FIG. 1–A;

FIG. 3 is a section view through the implement and coupling apparatus, taken generally along line 3—3 of FIG. 2; and FIG. 4 is a view, partly sectional, taken generally along broken line 4—4 of FIG. 2.

Reference is now made particularly to the drawings which illustrate the best presently known mode of carrying out the invention and wherein similar reference characters indicate the same parts throughout the several views.

By way of illustration, a vehicle is shown as a truck T and an implement is shown in the form of a snow blower S. Mounted on the implement is a frame, advantageously of inverted U-shape and including parallel upright members 11 and 12 and a cross member 14 at the upper end of the upright members. The frame is mounted on the side of the implement adjacent the vehicle and is conveniently attached to the implement by any convenient means such as upper structural members 16, 16′ and lower structural members 17, 17′. Upright members 11 and 12 are advantageously box-shaped and have a generally uniform cross-section. The upright members have generally smooth rail-engaging sides 11a, 12a and sides 11b, 12b opposite said rail-engaging sides for a purpose which will hereinafter become apparent. The upright members also have opposite-facing parallel inner sides 11c, 12c also for a purpose to become apparent.

A carrying structure is mounted on the truck T in any convenient manner as by mounting members 24 and 26 secured to the truck frame (not shown). The carrying structure includes spaced apart, vertically disposed rails, generally designated 21 and 22, which are rigidly secured, as by welding, to structural members 28 and 29 conveniently in the form of channels. There is advantageously provided means for holding the implement against lateral movement when coupled to the truck T. In the embodiment illustrated, this means is in the form of upper and lower shoulders 31, 31′ on rail 21 and advantageously adjacent the inner side thereof, and similarly located shoulders 32, 32′ on rail 22. Each shoulder preferably extends outwardly from the rail-engaging face a distance approximating the width of inner sides 11c, 12c. It can be seen that shoulders 31 and 31′ are in contraposition to shoulders 32 and 32′, thereby engaging opposite-facing sides 11c, 12c of the respective frame members 11 and 12 to hold the implement S against lateral movement when coupled to the truck T.

A centering means is provided for aligning the rails 21 and 22 with frame legs 11 and 12 when the vehicle T is moved to coupling position. In the embodiment illustrated, the centering means is advantageously mounted on the shoulders 31 and 32. The centering means includes a conveniently T-shaped central portion 35 intermediate rails 21 and 22 and extending toward the implement S a greater distance than shoulders 31 and 32. An end portion 36 connects one end of the intermediate portion 35 to shoulder 31 and, similarly, a second end portion 37 connects the other end to shoulder 32. Each end portion 36 or 37 is disposed at an angle to the plane of the respective shoulder and this angle is conveiently 45°. Thus, the end portions define cammed surfaces for guiding the frame members outwardly of shoulders 31 and 32 and into alignment with the rails when the truck T is moved to coupling position. The outwardly extending leg of the T-shaped portion 35 is conveniently cut back at the 45° angle, as shown at 38 and 39, to provide outward extensions of the cammed surfaces defined by end portions 36 and 37, respectively. A second, similarly-arranged centering means interconnects shoulders 31′ and 32′. The description for the second centering means is the same as that interconnecting shoulders 31 and 32 and described above. Accordingly, similar portions are indicated on the drawings by the same numbers followed by the postscript prime (′) and further description is deemed unnecessary.

A pair of hooks 51 and 52 are pivotally mounted adjacent the side of rails 21 and 22, respectively. As shown, each hook comprises an L-shaped member having a pivotal connection at one end to the inner side of the respective rail. The hooks are mounted intermediate the ends of the rails and are shaped for engaging the sides 11b, 12b of the frame members to hold the implement against the rails and thereby from longitudinal movement relative to the vehicle T. The pivotal connection is preferably closely adjacent the respective rail so that longitudinal forces on the hooks are transferred to the rails with a minimum moment. The hooks are swingable from a position engaged with the sides 11b and 12b to a disconnect position shown in FIG. 2. Means is provided for holding the hooks in engaged position, as shown in FIGS. 3 and 4. In the embodiment illustrated, this means comprises pins 54 insertable through openings in mountings 55, 55' mounted on the inside of the respective rail adjacent the upper and lower sides of the hook.

A pair of hydraulic cylinders 42, 44 are advantageously mounted on the front face of channel 29 as by T-shaped members 46 and fasteners 47. The hydraulic cylinders are of any convenient construction including a movable wall in the cylinder and rods 42a, 44a respectively, attached to the wall and extending upwardly therefrom. Attached at the upper ends of the rods 42a, 44a is a angle-shaped member 49 for engaging frame cross member 14 whereby selective operation of the cylinders vertically adjusts the implement S on the rails 21 and 22. It can be seen that the mounting of the cylinders 42 and 44 disposes them in a generally upright position intermediate and slightly in front of the rails. In this manner, member 49 is generally aligned with frame cross member 14 when the legs 11 and 12 are engaged with rails 21 and 22. Additionally, the hydraulic cylinders are disposed behind the central portions 35, 35' and are protected thereby. Hydraulic lines (not shown) advantageously extend to controls in the vehicle cab whereby the implement can be remotely vertically adjusted on the rails. It is contemplated that other means may be provided for vertically adjusting the implement on the rails, or that other numbers of hydraulic cylinders can be used.

In practice, and when desiring to attach the implement, the vehicle is moved toward the implement with the rails 21 and 22 generally aligned with legs 11 and 12. It is not necessary that they be exactly aligned since cammed surfaces 36, 36', 37, 37' will operate to center the legs on the vehicle. The same centering action cams the legs 11 and 12 outwardly of the shoulders 31, 31', 32, 32'. With the legs engaging the rails, hooks 51 and 52 are swung into position engaging the sides 11b and 12b of the legs and are locked into position by pins 54. In this manner then, the rails, shoulders, and hooks provide a generally U-shaped retention of each leg. It will be noted that each U-shaped retention is in contraposition to the other, thereby holding the frame against both lateral movement and longitudinal movement. The frame is, however, vertically adjustable on the rails 21 and 22, and the hydraulic cylinders 42 and 44 may then be selectively adjusted, bringing member 49 into engagement with cross member 14 to vertically adjust the implement S with respect to the truck T. A pair of openings 57 is provided in cross member 14 and, similarly, a pair of openings 58 is provided in member 49. When coupled, fasteners 59 (see FIG. 3) may be passed through these openings to further secure the implement to the vehicle.

It can be seen that the coupling and uncoupling can be easily accomplished with the present invention. All parts are sturdy so that the coupling is rigid and secure.

While a preferred embodiment of the invention has herein been illustrated and described, this has been done by way of illustration and not limitation, and the invention should not be limited except as required by the scope of the appended claims.

What is claimed is:

1. A coupling apparatus for coupling an implement to a vehicle and comprising:
    a frame on the implement and including a pair of generally parallel, upright members adjacent the vehicle;
    first and second generally upright rails mounted on the vehicle and aligned with said frame members for engaging the same;
    first means adjacent one side of the first rail and second means in contraposition adjacent the respective opposite side of the second rail for engaging opposite facing sides of the respective frame members to hold the implement against lateral movement;
    first and second hooks pivotally mounted adjacent the respective first and second rails intermediate the ends thereof for engaging the side of the frame members opposite the side engaged by the rails in one position, said hooks swingable from said one position to a disconnect position;
    means for holding the hooks in said one position; and
    means operatively connected to the vehicle for engaging the frame on the implement to vertically adjust the implement on the rails.

2. A coupling apparatus as set forth in claim 1 and including centering means mounted on the rails for guiding the frame members into alignment with the rails as the vehicle is moved to coupling position.

3. A coupling apparatus as set forth in claim 2 wherein said first and second means each includes upper and lower shoulders mounted on the inner side of the respective rail and extending toward the implement a distance approximating the thickness of said frame members, and wherein the centering means includes at least one central portion intermediate the rails and extending toward the implement a greater distance than said shoulders, a first end portion connected to the central portion and to one of the shoulders on the first rail, and a second end portion connected to the central portion and to one of the shoulders on the second rail, said end portions defining cammed surfaces for guiding the frame members outwardly of the shoulders and into alignment with the rails.

4. A coupling apparatus as set forth in claim 1 wherein each hook comprises an L-shaped member, and a pivotal connection between one end of the L-shaped member and one side of the respective rail and closely adjacent thereto; and wherein the means for holding the hooks in said one position comprises a removable pin for engaging the L-shaped member and holding the same against said one side of the rail, and means mounted on said one side of the rail for holding the pin in position.

5. A coupling aparatus as set forth in claim 1 wherein the implement frame includes a cross member connected to the upright members, and wherein the last-mentioned means includes hydraulically actuated means mounted intermediate the rails for engaging the cross member to vertically adjust the implement.

6. A coupling apparatus as set forth in claim 1 wherein:
    the frame includes a cross member connected to the upright members adjacent the upper ends thereof;
    the first and second means each includes upper and lower shoulders mounted on the inner side of the respective rail and extending toward the implement, an upper and a lower member connecting the rspective upper and lower shoulders and each including a central portion extending toward the implement a distance greater than said shoulders, and end portions each connecting the central portion to the outer end of the shoulder and defining a cammed surface for guiding the frame members into alignment with the rails;
    each hook is pivotally mounted on the inner side of the respective rail and closely adjacent thereto; and
    the last-mentioned means includes hydraulic cylinder means mounted in a generally upright position intermediate the rails and behind said central portion, a rod extending upwardly from the cylinder, and means at the upper end of the rod for engaging the frame cross member, whereby selective operation of the hydraulic cylinder means vertically adjusts the implement on the rails.

7. A coupling apparatus for coupling a vehicle and a snow removal implement and the like having an inverted U-shaped frame thereon, said coupling apparatus including: a carrying structure having means for attachment to the vehicle, a pair of generally upright rails on said structure in alignment with the legs of said U-shaped frame for engaging the same, means adjacent the inner side of each rail for engaging the opposed inner edges of said frame legs and for holding the implement against lateral movement, centering means mounted on said last-mentioned means for aligning the rails and said frame legs when the vehicle is moved to coupling position, first and second hook means pivotally mounted on the respective first and second rails for engaging the back side of the corresponding frame leg and holding the frame against longitudinal movement, said hook means movable from said engaged position to a second position for uncoupling, means for holding the hook means in engaged position, and hydraulically operated means mounted on the carrying frame structure for engaging the central portion of said U-shaped frame and vertically adjusting the implement on the rails.

References Cited

UNITED STATES PATENTS

| | | | |
|---|---|---|---|
| 2,256,273 | 9/1941 | Begley | 37—42 |
| 2,590,210 | 3/1952 | Rogers | 280—477 |
| 2,710,464 | 6/1955 | Husting | 37—42 |
| 2,794,678 | 6/1957 | Busey et al. | 172—276 |
| 3,034,587 | 5/1962 | Dorkins et al. | 280—477 |
| 3,233,350 | 2/1966 | Malzahn et al. | 172—272 |

ROBERT E. PULFREY, *Primary Examiner.*

E. H. EICKHOLT, *Assistant Examiner.*